J. G. A. KITCHEN.
MEANS FOR VARYING THE SPEED AND STOPPING WAY OF AIRCRAFT WITHOUT SLOWING THE PROPELLER.
APPLICATION FILED JULY 26, 1920.

1,392,831. Patented Oct. 4, 1921.

Inventor
J. G. A. Kitchen
By H. R. Kerslake
Attorney

UNITED STATES PATENT OFFICE.

JOHN GEORGE AULSEBROOK KITCHEN, OF LANCASTER, ENGLAND.

MEANS FOR VARYING THE SPEED AND STOPPING WAY OF AIRCRAFT WITHOUT SLOWING THE PROPELLER.

1,392,831. Specification of Letters Patent. Patented Oct. 4, 1921.

Application filed July 26, 1920. Serial No. 399,164.

(GRANTED UNDER THE PROVISIONS OF THE ACT OF MARCH 3, 1921, 41 STAT. L., 1313.)

*To all whom it may concern:*

Be it known that I, JOHN GEORGE AULSEBROOK KITCHEN, a subject of the King of Great Britain and Ireland, and resident of 7 Rose Bank, Scotforth, Lancaster, in the county of Lancaster, England, have invented certain new and useful Improved Means for Varying the Speed and Stopping Way of Aircraft Without Slowing the Propeller, for which I have filed an application in Great Britain, 124,572, dated March 27, 1918, of which the following is a specification.

This invention has for its object to provide new or improved means for controlling in a ready and efficient manner the speed of aircraft without the necessity for varying the propeller speed, and so facilitate landing in confined areas and quick maneuvering, and increase the chances of obtaining hits by bombers from aircraft by enabling the latter to be rapidly slowed down during the actual bombing operations. A further object of the invention is to provide efficient steering means for aircraft, the said steering means serving also for controlling the speed of the aircraft in the manner aforesaid, when desired.

The invention comprises the arrangement upon the aircraft, of rudder-like parts constructed and arranged in pairs and adapted when in their out-of-service position to lie in a line parallel with the direction of travel of the aircraft, with means for causing the rearward edges of the rudders to be brought in contact to form a pocket for the purpose of exerting a more or less rapid retarding action upon the aircraft for the purpose referred to.

The invention further comprises the arrangement whereby the duplex rudders aforesaid may be tilted in a vertical plane for elevating or depressing the aircraft.

The accompanying explanatory drawings illustrate in diagrammatic form the application of my invention.

The same reference letters in the different views indicate the same or similar parts.

Figure 1:
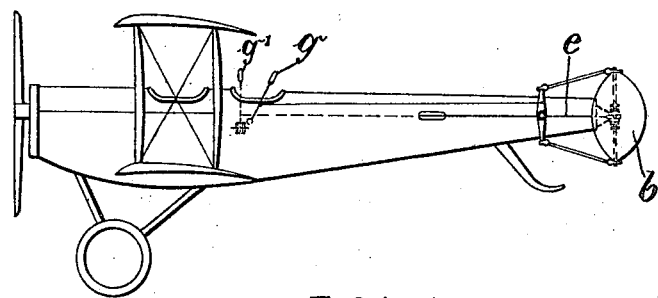
Figure 1 is a diagram illustrating the application of my invention to a bi-plane.

The bi-plane illustrated is provided with rudders $a$, $b$ at its tail, the said rudders being fulcrumed about a cross member $c$ which is itself fulcrumed about the tail piece $d$. The rudders are actuated by operating rods $e$ attached to the bars $f$. The reciprocation of the said bars to give the desired movements to the rudders is effected by the movement of a hand lever as $g'$, or otherwise; there being one such hand lever for each rod $e$, so that the rudders can be moved simultaneously or independently. If desired, horizontal planes may be employed in place of the bars $f$ so that if the rudders be tilted in a vertical plane about the tail piece $d$, by means of the operating mechanism shown in diagram form in Fig. 1 and controlled by the handle $g$, for the purpose of obtaining or losing altitude, the said horizontal planes will assist in the said action. In Fig. 1, the ordinary elevating planes and vertical fin are not shown. When the bars $f$ form elevating planes, the ordinary elevating planes may be made to move uniformly with them.

The steering of the aircraft may be effected by the rudders $a$, $b$ alone or in conjunction with the usual rudders provided therefor, the rudders $a$, $b$ in this case being moved simultaneously in the same circular direction so as to deflect the air passing between them.

In order to vary the speed of the aircraft while its propeller or propellers rotates or rotate at a constant speed, the rudders $a$, $b$ are moved simultaneously in opposite directions, that is either toward or away from one another. If brought with their rear edges together, they form a pocket and exert a maximum drag or retarding effect upon the aircraft.

Figure 4:
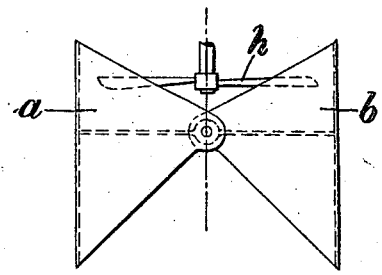
Fig. 4 shows a modified arrangement of the rudders.
Figure 2:
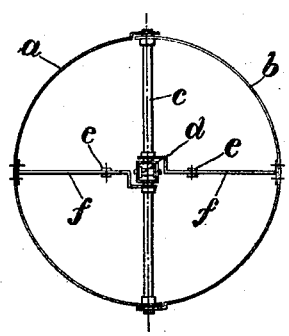
Figs. 2 and 3 are details of the rudder mechanism, Fig. 3 being a plan view and Fig. 2 an end elevation.
Figure 3:
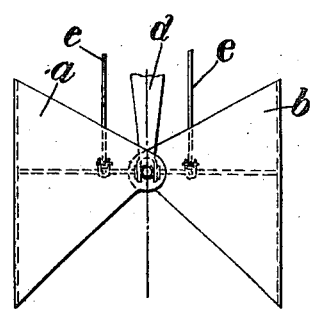

In the diagram, Fig. 4, the rudders $a$, $b$ are arranged at the opposite sides of the propeller $h$ and are adapted to close in at its rear so as to deflect or reverse the stream of air issuing from the propeller. This arrangement may be applied to push type machines and particularly to dirigible lighter-than-air machines.

The arrangements before described are given as examples of the application of my invention, but the details of such application will be varied to suit circumstances and requirements.

Having now described my invention what I claim as new and desire to secure by Letters Patent is:—

In apparatus for varying the speed or way of aircraft without varying the propeller speed, the combination consisting of a pair of rudders, means for moving the rearward edges of said rudders into contact to form an air pocket, and means for tilting the said rudders in a vertical plane to elevate or depress the air craft, as set forth.

In testimony whereof I have signed my name to this specification.

JOHN GEORGE AULSEBROOK KITCHEN.